United States Patent [19]

Kawada et al.

[11] Patent Number: 4,626,725
[45] Date of Patent: Dec. 2, 1986

[54] SYNCHRONOUS ROTARY MACHINE

[75] Inventors: Shigeki Kawada; Yoichi Amemiya; Masatoyo Sogabe, all of Hachioji; Noboru Iwamatsu, Hino, all of Japan

[73] Assignee: Fanuc Ltd, Yamanashi, Japan

[21] Appl. No.: 796,480

[22] PCT Filed: Feb. 27, 1985

[86] PCT No.: PCT/JP85/00092
§ 371 Date: Oct. 25, 1985
§ 102(e) Date: Oct. 25, 1985

[87] PCT Pub. No.: WO85/04057
PCT Pub. Date: Sep. 12, 1985

[30] Foreign Application Priority Data

Feb. 27, 1984 [JP] Japan .................. 59-34370

[51] Int. Cl.$^4$ ............................ H02K 5/00
[52] U.S. Cl. ........................ 310/89; 310/91; 310/258
[58] Field of Search .......... 310/89, 90, 91, 42, 310/162, 163, 164, 165, 258, 51, 156

[56] References Cited

U.S. PATENT DOCUMENTS

| 1,539,527 | 5/1925 | Torrance | 310/258 |
| 2,489,840 | 11/1949 | White | 310/91 |
| 4,170,057 | 10/1979 | Roddy | 310/89 |
| 4,295,268 | 10/1981 | Punshon | 310/90 |

FOREIGN PATENT DOCUMENTS

| 0073703 | 9/1973 | Japan | 310/89 |
| 0038949 | 4/1981 | Japan | 310/89 |
| 0106032 | 8/1981 | Japan | 310/89 |
| 0143450 | 9/1983 | Japan | 310/89 |
| 0037855 | 3/1984 | Japan | 310/89 |

Primary Examiner—R. Skudy
Attorney, Agent, or Firm—Armstrong, Nikaido, Marmelstein & Kubovcik

[57] ABSTRACT

A synchronous rotary machine comprising a stacked stator iron core (21) made of a number of thin plates stacked in the axial direction. The stator iron core forms a part of the outer shell of the synchronous rotary machine. A winding (23) is wound around the stator iron core. A pair of brackets (24, 25) are attached to the opposite ends of the stator iron core. A rotor assembly (29) is rotatably supported on the brackets through bearings mounted to the brackets, respectively. The brackets and stator iron core are tightened in the axial direction thereof and firmly fixed to each other. At least two rods (31) having the same length are provided on the stator iron core. Each of the rods extends through the stator iron core in the axial direction. When the stator iron core is contracted to a predetermined length, the opposite end surfaces thereof abut against the brackets, respectively, and limit the distance between the brackets.

5 Claims, 7 Drawing Figures

4,626,725

SYNCHRONOUS ROTARY MACHINE

TECHNICAL FIELD

The present invention relates to a synchronous rotary machine, more particularly to a synchronous rotary machine in which a stacked iron core forms a part of the outer shell thereof.

BACKGROUND ART

Generally, when a synchronous rotary machine, e.g., a synchronous motor of the permanent-magnet field type is used as an AC servo motor, the outer shell of the motor has formed thereon connection portions, i.e., close-fitting engagement portions or mounting surfaces to enable precise attachment to the motor mount of the machine tool or the like. Hight accuracy is required in the concentricity of the connection portions of the outer shell of the motor to the rotor shaft, in the squareness of the mounting surfaces of the outer shell of the motor to the axis of the rotor shaft, etc.

Use has been made in the past of a synchronous rotary machine in which the stacked iron core of the stator forms a part of the outer shell of the rotary machine. The construction of a conventional, general stator assembly of a synchronous rotary machine is shown in FIG. 1. Referring to the figure, a stator iron core 2 is made of a number of thin plates stacked in the axial direction. The stator iron core 2, having thereon a winding, is provided at opposite ends thereof with thick end plates 3 and 4. As also shown in FIG. 2, a plurality of tie rods 5 are fitted into fitting grooves formed both in the stator iron core 2 and the end paltes 3 and 4. The tie rods 5 are welded to the stator iron core 2 and the end plates 3 and 4. From this construction, the thin plates of the stator iron core 2 are fixed to each other, and the end plates 3 and 4 are firmly fixed with respect to the stator core 2.

After the welding is finished, the end portions of the end plates 3 and 4 are machined to a precision finish to form connection portion 3a and 4a. Meanwhile, brackets 6 and 7 are machined to a precision finish with holes 6a and 7a to fit the connection portions 3a and 4a of the end plates 3 and 4 and with mounting holes 6b and 7b for the bearing members. Further, the fore bracket 6 is machined to a precision finish with a connection portion 6c and a mounting surface 6d to be fit to the mount of the machine tool. After the machining work is finished, the brackets 6 and 7 are fitted into the connection portions 3a and 4a of the end plates 3 and 4, respectively, and then firmly fixed by means of a plurality of tie bolts 8.

In such a conventional stator, since the welded assembly of the stator core 2 and the end plates 3 and 4 is assembled to the brackets 6 and 7 after the welded assembly and brackets 6 and 7 are machined individually as described above, the number of portions to be precisely machined increases. Further, the individual dimentional errors produced by the machining are accumulated by the joining of the welded assembly and the brackets, so the final accuracy of the stator is decreased. Furthermore, since the stator iron core 2 is welded, a large strain is caused by the welding in the stator iron core 2, as shown by the two-dot chain line in FIG. 2, inviting an increase in the fluctuations in the output torque of the synchronous rotary machine.

FIG. 3 shows the construction of another conventional stator. Referring to this figure a fore bracket 6 and a rear bracket 7 are directly attached to the opposite ends of the stacked stator iron core 2 with the winding. The stator iron core 2 and the brackets 6 and 7 are tightened and fixed by means of a plurality of tie bolts 8. Mounting holes 6b and 7b of the brackets 6 and 7 for the bearing members, the connection portion 6c and the mounting surface 6d of the fore bracket 6 are formed by machining after the stator iron core and the brackets are fixed in place by the bolts 8. Therefore, the problem of accumulation of the dimentional errors does not occur. Further, it is not necessary to firmly form the stacked stator iron core 2 before the stator iron core 2 and the brackets 6 and 7 are assembled. It is enough to perform some simple treatment, e.g., TIG-welding, to prevent the core from falling out of shape. Therefore, the stator iron core 2 will not deform much under heat.

However, in the case of the latter method, the stacked stator iron core 2 will deform when subjected to a large external force. Therefore, when tightening the tie bolts 8, as schematically shown in FIG. 4, variations in the amount of tightening of the tie bolts 8 will result in a large deviations in the concentricity between the brackets 6 and 7 with respect to the stator iron core 2. This makes subsequent machining difficult. Further, since the stator iron core 2 can stretch and deform in the axial direction after tightening, it is difficult to keep the shape of the stator regular. Thus, subsequent machining becomes difficult, making it impossible to obtain high machine accuracy, or sufficient strength.

DISCLOSURE OF THE INVENTION

One object of the present invention is to overcome the drawbacks of synchronous rotary machines in which the stacked iron core forms a part of the outer shell of the synchronous rotary machine and to provide a synchronous rotary machine having a high machine accuracy and sufficient strength.

According to the present invention, the above-mentioned object is achieved by providing a synchronous rotary machine comprising: a stator iron core forming a part of the outer shell of the rotary machine and made of a number of thin plates stacked in the axial direction; a winding wound around said stator iron core; a pair of brackets attached to opposite ends of said stator iron core, respectively; a rotor assembly rotatably supported on said brackets through bearing members mounted on said brackets, respectively; a plurality of tightening members for tightening said brackets and said stator iron core in the axial direction thereof so that said stator iron core and said brackets are firmly tightened to each other; and at least two rods extending in the axial direction through said stator iron core and limiting the distance between said brackets in such a manner that each of the rods abuts at the opposite ends thereof to said brackets when said stator iron core is contracted to a predetermined length.

In this synchronous rotary machine, it is necessary to precisely machine the brackets to form the mounts for the bearing members, connection portions, surfaces, etc. for the mounting to the machine tool or the like using the synchronous rotary machine, and other portions requiring machine accuracy. Such machining may be effected after the stator iron core and the brackets are firmly tightened by the tightening members. The amounts of tightening of the stator iron core by each of the tightening members are kept equal owing to the length of the rods. Therefore, the concentricity of the brackets to the axis of the stator iron core is not shifted. Since the opposite ends of the rods abut the brackets, respectively, and the stator iron core is firmly tightened in the axial direction, the stator iron core can maintain its shape even when the brackets are machined. Therefore, it is possible to provide a synchronous rotary machine having a high machine accuracy.

The foregoing and other features and advantages of the present invention will become more apparent from the following detailed description with reference to the attached drawings.

BEST MODE FOR CARRYING OUT THE INVENTION

Figure 5:
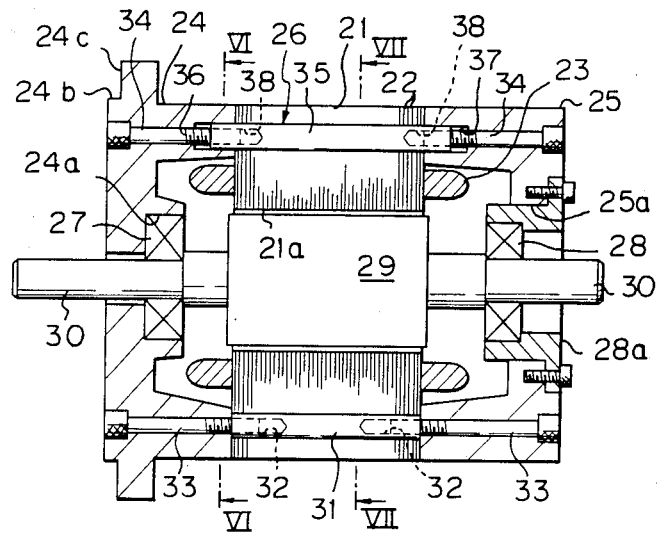
FIG. 5 is a sectional view taken along a line V—V in FIG. 6 illustrating a synchronous rotary machine of the permanent-magnet field type according to one embodiment of the present invention.
Figure 6:
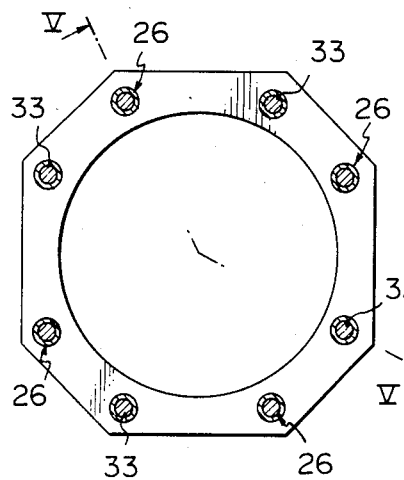
FIG. 6 is a sectional view taken along a line VI—VI in FIG. 5 illustrating the stator of the synchronous rotary machine shown in FIG. 5.
Figure 7:
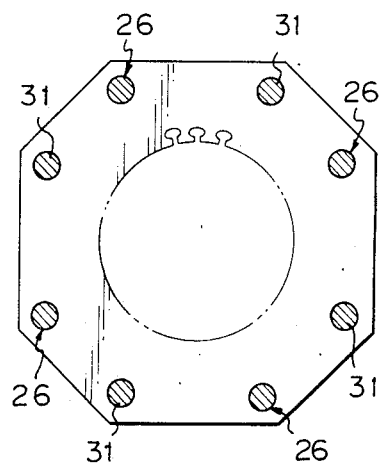
FIG. 7 is a sectional view taken along a line VII—VII in FIG. 5 illustrating the stator of the synchronous motor shown in FIG. 5.

Referring to FIGS. 5 through 7, the stator of the synchronous motor according to the present invention comprises a stator iron core 21 made of a number of thin steel plates 22 stacked in the axial direction. The stator iron core 21 is provided thereon with a winding 23. The stator iron core 21 has at the center thereof a cylindrical bore 21a which extends in the axial direction therethrough.

The stator iron core 21 is provided with a fore bracket 24 and a rear bracket 25 which abut against the opposite ends of the stator iron core 21, respectively. In this embodiment, the brackets 24 and 25 are secured to the opposite ends of the stator iron core 21 by means of four tightening members 26. A bearing 27 is mounted in a central bore 24a of the fore bracket 24. A holder 28a for holding thereon a bearing 28 is fitted into a central bore 25a of the rear bracket 25. The holder 28a is attached to the rear bracket 25 by means of screws. A rotor assembly of the permanent-magnet field type includes a shaft 30 which is rotatably supported on the brackets 24 and 25 by the bearings 27 and 28.

Four rods 31 having a equal length to each other are arranged extending in the axial direction through the stator iron core 21 between the brackets 24 and 25. The rods 31 and tightening members 26 are arranged alternately in the stator iron core 21 along a circumferential direction thereof. The opposite end surfaces of each of the rods 31 abut against the brackets 24 and 25, respectively, and limit the distance between the brackets 24 and 25.

Each of the rods 31 has at the opposite ends thereof threaded holes 32. The brackets 24 and 25 are connected to the rods 31 by means of the bolts 33 which are screwed into the threaded holes 32 of the rods 31, respectively.

In this embodiment, each of the tightening members 26 includes a pair of bolts 34 and a connecting bar 35 which is longer than the rods 31. Each of the connecting bars 35 extends through the stator iron core 21 in the axial direction thereof. The opposite end portions of each of the connecting bars 35 are slidably fitted into holes 36 and 37 formed in the brackets 24 and 25, respectively. Each connecting bar 35 has threaded holes 38 formed in the opposite end surfaces thereof. The bolts 34 extend through the holes 36 and 37 of the brackets 24 and 25 and screw into the threaded holes 38 of the connecting bars 35, respectively.

When the brackets 24 and 25 are attached to the stator iron core 21, the stacked stator iron core 21 is contracted in the axial direction by tightening the tightening members 26 until the opposite ends of each of the rods 31 abut against the brackets 24 and 25. Since the length of the rods 31 are equal to each other, the contraction amount of the stator iron core 21 is kept uniform at all positions in the circumferential direction thereof. Consequently, is is possible to prevent misalignment of the centers of the brackets 24 and 25 with respect to the stator iron core 21. Therefore, it is possible to carry out the machining described later after the tightening without any interference. Further, since the brackets 24 and 25 are firmly connected to each other through the rods 31, having rigidity, under a tightening load, the stator iron core 21 can be kept regular in shape. Therefore, it is possible to obtain a stator having a high rigidity.

A connection portion 24b for engaging the motor into a hole (not shown) of the machine tool or the like and a mounting surface 24c for placement of the motor on a surface of the machine tool or the like are formed on the fore bracket 24. A shaft 30 of the rotor 29 of the motor is connected to a shaft (not shown) of the machine tool or the like. It is necessary to improve the accuracy of concentricity of the holes 24a and 25a of the brackets 24 and 25 to the shaft 30 of the motor in order to improve the accuracy of concentricity of the shaft 30 to the shaft of the machine tool or the like. Further, it is necessary to improve the accuracy of concentricity of the connection portion 24b of the fore bracket 24 to the shaft 30 and of squareness of the surface 24c of the fore bracket 24 to the shaft 30. According to the present invention, these portions requiring accuracy can be precisely finished by machining using one of the mounting holes for the bearings or the connection portions as a reference plane after firmly fixing the brackets 24 and 25 to the stator iron core 21 by means of the tightening members 26. If the brackets 24 and 25 are assembled with the stator iron core 21 after the finishing treatment thereof, the dimensional errors of the treated portions would accumulated. According to the present invention, however, the problem can be eliminated, and thus it is possible to obtain a stator of a motor having a high dimensional accuracy. The rotor 29 and the holder 28a are precisely machined and then incorporated into the machined stator.

Although the foregoing explanation has been made in reference to one embodiment of the present invention, the present invention is not limited to only the above-mentioned embodiment but can be embodied in various forms without departing from the scope of the present invention as defined by the claims.

For example, it is possible to apply a temporary fixing treatment to the stacked stator iron core 21 for preventing the stacked stator iron core 21 from falling out of shape. For this treatment, a simple tightening means, e.g., adhesive material, TIG-welding, clip, or the like can be used.

Figure 1:
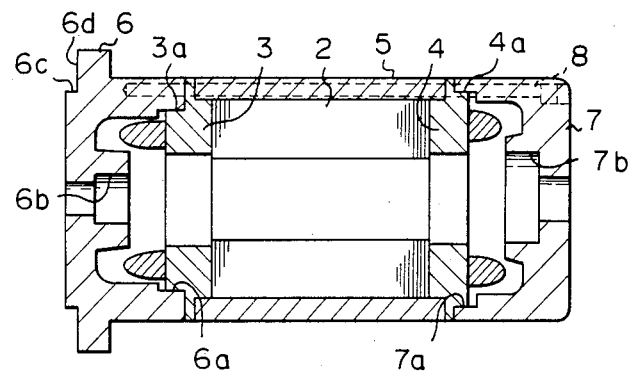
FIG. 1 is a sectional view illustrating the construction of the stator of a conventional synchronous rotary machine.
Figure 2:
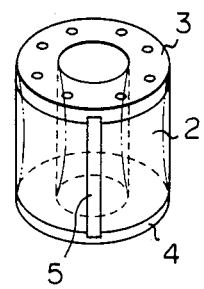
FIG. 2 is a perspective view schematically illustrating the deformation of the stator shown in FIG. 1.
Figure 3:
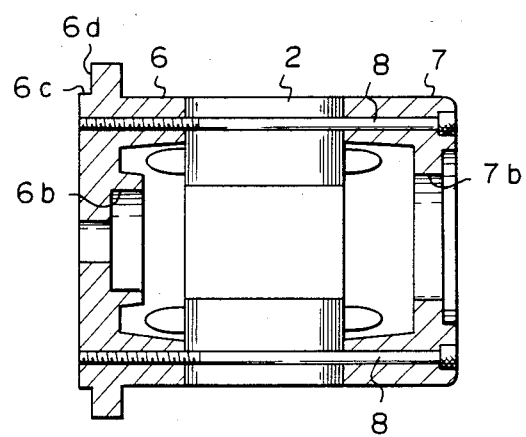
FIG. 3 is a sectional view illustrating the construction of the stator of another conventional synchronous rotary machine.
Figure 4:
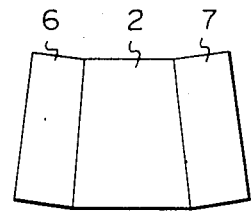
FIG. 4 is a front view schematically illustrating the deformation of the stator shown in FIG. 3.

Further, although each of the tightening members 26 includes a pair of bolts and a connecting bar, it may be a penetrating bolt such as, for example, one shown in FIG. 3.

Furthermore, the brackets 24 and 25 may be provided at the inner end surface thereof with cavities for fitting to the opposite ends of the rods 31. The bolts 33 in the above-mentioned embodiment may be omitted. The number of the tightening members 26 and the rods 31 are not limited to the above-mentioned numbers.

CAPABILITY OF EXPLOITATION IN INDUSTRY

The synchronous rotary machine according to the present invention can be applied as a permanent-magnet field motor or other synchronous motors, and it is able to provide a synchronous rotary machine having high dimensional accuracy and high strength while keeping the size small.

We claim:

1. A synchronous rotary machine comprising:
   a stator iron core forming a part of the outer shell of the rotary machine and made of a number of thin plates stacked in the axial direction;
   a winding wound around said stator iron core;
   a pair of brackets attached to opposite ends of said stator iron core, respectively;
   a rotor assembly rotatably supported on said brackets through bearing members mounted on said brackets, respectively;
   a plurality of tightening members for tightening said brackets and said stator iron core in the axial direction thereof so that said stator iron core and said brackets are firmly tightened to each other; and
   at least two rods extending in the axial direction through said stator iron core and limiting the distance between said brackets in such a manner that each of the rods abuts at the opposite ends thereof to said brackets when said stator iron core is contracted to a predetermined length.

2. A synchronous rotary machine as set forth in claim 1, characterized in that each of said rods has at the opposite ends thereof threaded holes and that said brackets are connected to said rods by means of bolts which are screwed into said holes of said rods.

3. A synchronous rotary machine as set forth in claim 1, characterized in that eagh of said tightening members includes a connecting bar which is longer than said rods and a pair of bolts, each of said connecting bars being fitted at the opposite ends thereof into holes formed in said brackets and having at the opposite end surface thereof threaded holes, said bolts extending through said holes in said brackets and being screwed into said threaded holes of said connecting bars, respectively.

4. A synchronous rotary machine as set forth in claim 1, characterized in that a temporary fixing treatment is previously applied to said stator iron core for preventing said stator iron core from falling out of shape.

5. A synchronous rotary machine as set forth in claim 1, characterized in that said rotor is a permanent-magnet field rotor.

* * * * *